N. BARNETT.
ANTISKIDDING DEVICE.
APPLICATION FILED JAN. 20, 1909.
955,306.
Patented Apr. 19, 1910.
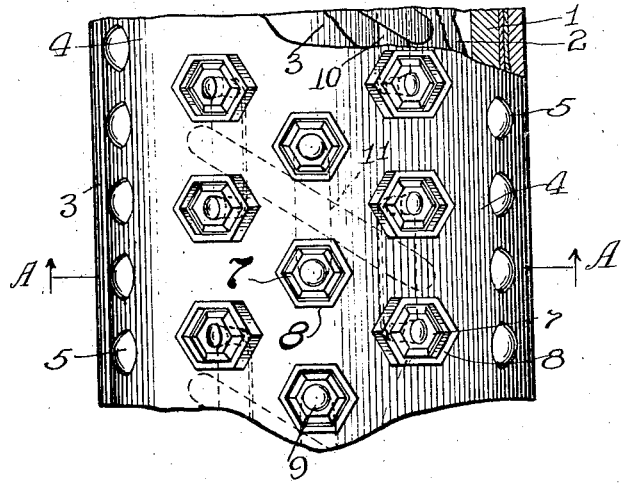
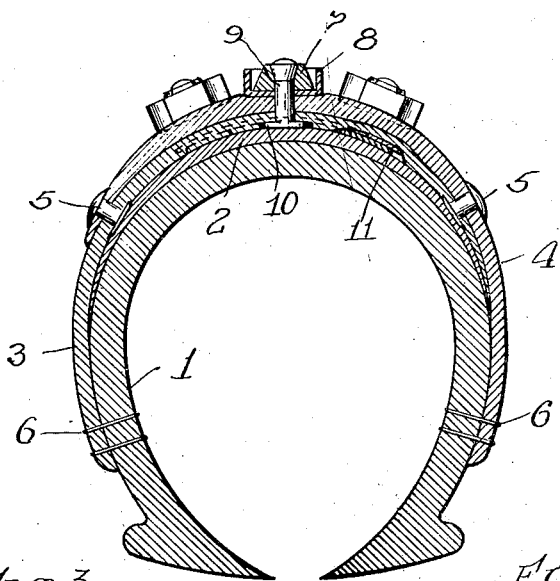
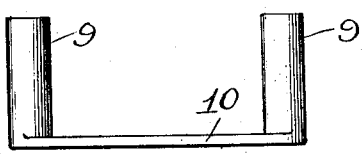
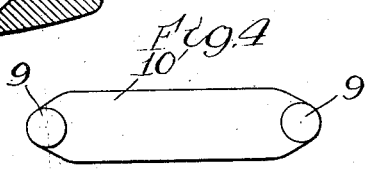
Witnesses
R. A. White
H. R. L. White
Inventor
Nathan Barnett,
By Kummler & Kummler
Atty's

UNITED STATES PATENT OFFICE.

NATHAN BARNETT, OF CHICAGO, ILLINOIS.

ANTISKIDDING DEVICE.

955,306.  Specification of Letters Patent.  Patented Apr. 19, 1910.

Application filed January 20, 1909. Serial No. 473,366.

*To all whom it may concern:*

Be it known that I, NATHAN BARNETT, a citizen of the United States of America, and a resident of Chicago, Cook county, State of Illinois, have invented certain new and useful Improvements in Antiskidding Devices, of which the following is a specification.

The main objects of this invention are to provide improved means for preventing the skidding or slipping of vehicle tires; to provide an improved construction for antiskidding devices which project from the tread surface of vehicle tires; and to provide improved means for securing and mounting such devices to the tire structure.

A specific structure for accomplishing these objects is illustrated in the accompanying drawings, in which:

Figure 1 is a fragmentary view of the tread surface of a vehicle tire constructed according to this invention. Fig. 2 is a transverse section of the tire on the line A—A of Fig. 1. Fig. 3 is a side elevation of one of the U-shaped rivets which form part of the anti-skidding devices shown in Figs. 1 and 2. Fig. 4 is a top plan of the same.

In the construction shown in the drawings, the casing of the tire comprises a main casing 1, preferably of rubber and canvas, and a plurality of layers 2, 3 and 4, preferably of leather, mounted over the tread surface of the main casing 1 in the usual manner. The layer 2 is cemented to the casing 1 and to the adjacent parts of the layers 3 and 4, which are also cemented to the main casing and to each other. The layers 3 and 4 are riveted together by means of the rows of rivets 5, and they are also secured to the casing 1 by rows of stitching indicated at 6.

The anti-skidding devices are arranged in a plurality of rows extending around the entire periphery of the tread surface of the tire, the successive anti-skidding devices being equally spaced. Each of the anti-skidding devices comprises a bur or head 7 surrounded by a cup-shaped member 8 which is polysided in form, preferably hexagonal, and provided with an outwardly extending flange spaced away from the head 7 at each side and mounted on the tire so that two of its flat sides will stand substantially at right angles to the plane of the wheel and thereby offer maximum resistance to the slipping of the wheel. The heads 7 are preferably also of a similar contour to that of the cups 8 and are preferably of frusto-pyramidal shape so that their sides incline away from the adjacent sides of the flanges of the cups and therefore present separate shoulders for resisting slipping of the tire on the roadway.

In the form shown, the anti-skidding devices are connected together in pairs by means of U-shaped rivets each comprising a pair of shanks 9 connected together by a flat broad yoke 10. These rivets are mounted in the material of the tire, so that the yokes extend in a circumferential direction, as shown in Fig. 2, and the shanks in adjacent circumferential rows are staggered with respect to each other. The shanks 9 of the rivets preferably extend through both layers 3 and 4 of leather, but the yokes are separated from the casing 1 by means of the inner layer of leather 2. The tops of the heads 7 are preferably countersunk, and the ends of the shanks 9 are upset so as to fill the countersinks and securely hold the heads against rotation and also clamp the cups 8 between the heads and the outer layer 4 of the casing. The bases of the heads 7 approximately fit the bottoms of the recesses in the cups 8 and thereby prevent said cups from rotating.

The broad yokes spread the strain upon the shanks 9 over a large area and thereby positively prevent the possibility of the rivets working loose and being torn out from the leather covering. If desired, an additional precaution may be taken for accomplishing this end, by inserting between the layers of leather transverse strips of thin, resilient metal, indicated at 11 in Fig. 1. These extend across the tops of the yokes 10 and connect the rivets of each row with those of the adjacent rows.

In operation these anti-skidding devices present a maximum resistance to slipping, for the reason that not only do the heads 7 of the rivets embed themselves into the surface of the road and present flat surfaces, due to their polysided shape, for resisting slipping, but the cups also present separate flat surfaces for the same purpose.

Although but one specific embodiment of this invention is herein shown and described, it will be understood that numerous details of the construction shown may be altered or omitted without departing from the spirit of this invention.

I claim:—

1. A vehicle tire, comprising a casing and a plurality of anti-skidding devices arranged around the tread surface thereof, each of said devices comprising a cup-shaped washer having an upstanding polysided flange, and a polysided frusto-pyramidal head inclosed by the flange, the flat edges of the bases of said heads fitting within the flanges of said washers so as to prevent the washers from turning with respect to the heads.

2. An anti-skidding device, comprising a pair of shanks, an integral transverse yoke connecting said shanks, polysided frusto-pyramidal heads mounted on the outer ends of said shanks, and poly-sided cup-shaped washers mounted on said shanks inward of the heads and comprising up-standing flanges surrounding and having their upper edges spaced away from the sides of said heads, the flat edges of the bases of said heads fitting within the flanges of said washers so as to prevent the washers from turning with respect to the heads.

3. A vehicle tire, comprising a casing, a plurality of anti-skidding devices distributed around the tread surface thereof and each comprising a shank, a head at the outer end of the shank and a cup-shaped washer mounted below the head and having an upstanding flange surrounding the head, flat yokes connecting said shanks in pairs at their inner ends, and reinforcing strips embedded in the casing and extending across from one yoke to another between said yokes and heads.

4. A vehicle tire, comprising a casing, a plurality of anti-skidding devices distributed around the tread surface thereof and each comprising a shank, a head at the outer end of the shank and a cup-shaped washer mounted below the head and having an upstanding flange surrounding the head, flat yokes connecting said shanks in pairs at their inner ends, said yokes being disposed in a circumferential direction and in a plurality of circumferential rows and those in adjacent rows being in staggered relation to each other, and diagonally disposed reinforcing strips extending across the yokes from one row to another and located between the respective yokes and heads.

Signed at Chicago this 16th day of January, 1909.

NATHAN BARNETT.

Witnesses:
EUGENE A. RUMMLER,
MARY M. DILLMAN.